No. 776,299. PATENTED NOV. 29, 1904.
L. A. CORNELIUS.
WATER SEALING TRAP.
APPLICATION FILED MAR. 25, 1904.
NO MODEL.

Witnesses
Mary S. Tooker
A. C. Denison

Inventor
Louis A. Cornelius
By Edward Taggart
His Attorney

No. 776,299. Patented November 29, 1904.

UNITED STATES PATENT OFFICE.

LOUIS A. CORNELIUS, OF GRAND RAPIDS, MICHIGAN.

WATER-SEALING TRAP.

SPECIFICATION forming part of Letters Patent No. 776,299, dated November 29, 1904.

Application filed March 25, 1904. Serial No. 200,020. (No model.)

*To all whom it may concern:*

Be it known that I, LOUIS A. CORNELIUS, a citizen of the United States, residing at Grand Rapids, in the county of Kent and State of Michigan, have invented new and useful Improvements in Water-Sealing Traps, of which the following is a specification.

This invention relates to a new and useful water-sealing trap for pipe connections; and the invention consists in the combination and arrangement of parts hereinafter described and claimed.

The objects of the invention are, first, to so construct the trap that it can be effectively used in connection with two inlet water-pipes and one outlet-pipe opening on the opposite side from one of the inlet-pipes; second, to combine with two inlet water-pipes and one outlet water-pipe an elongated trap-chamber, and an inclined partition within the chamber, whereby a considerable quantity of water may be held in the trap for sealing purposes; third, to combine with an elongated trap having two inlet water-pipes and one outlet water-pipe an open vent-pipe by opening in the same trap-chamber; fourth, to so construct a water-sealing trap, with its connections, that it will occupy the least possible space vertically; fifth, other objects hereinafter described and claimed.

These objects I accomplish by means of the mechanism illustrated in the accompanying drawings, in which—

Figure 2:
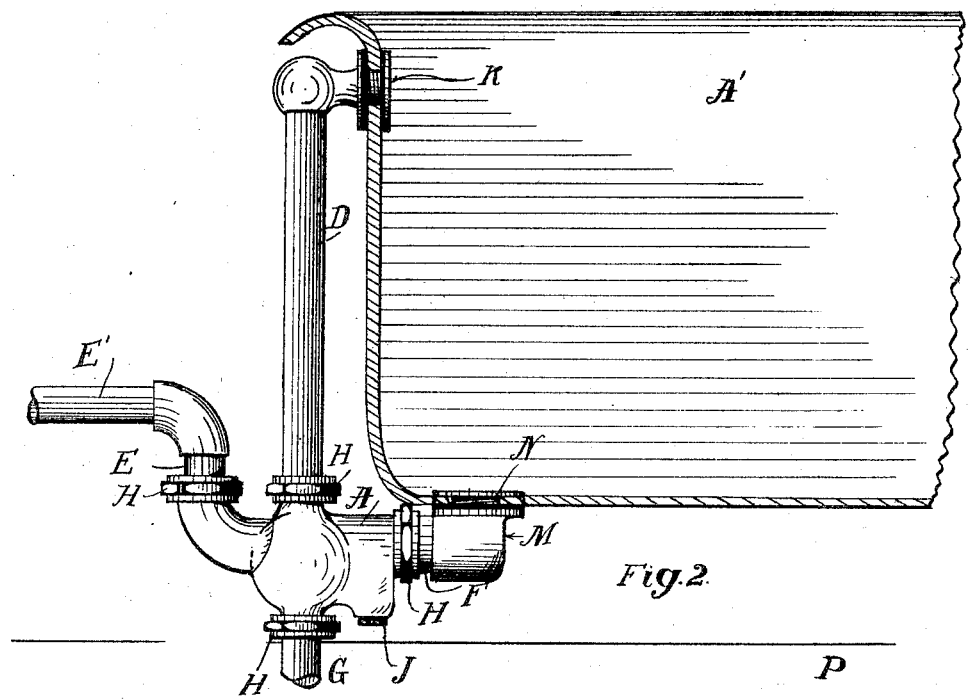
Figure 1:
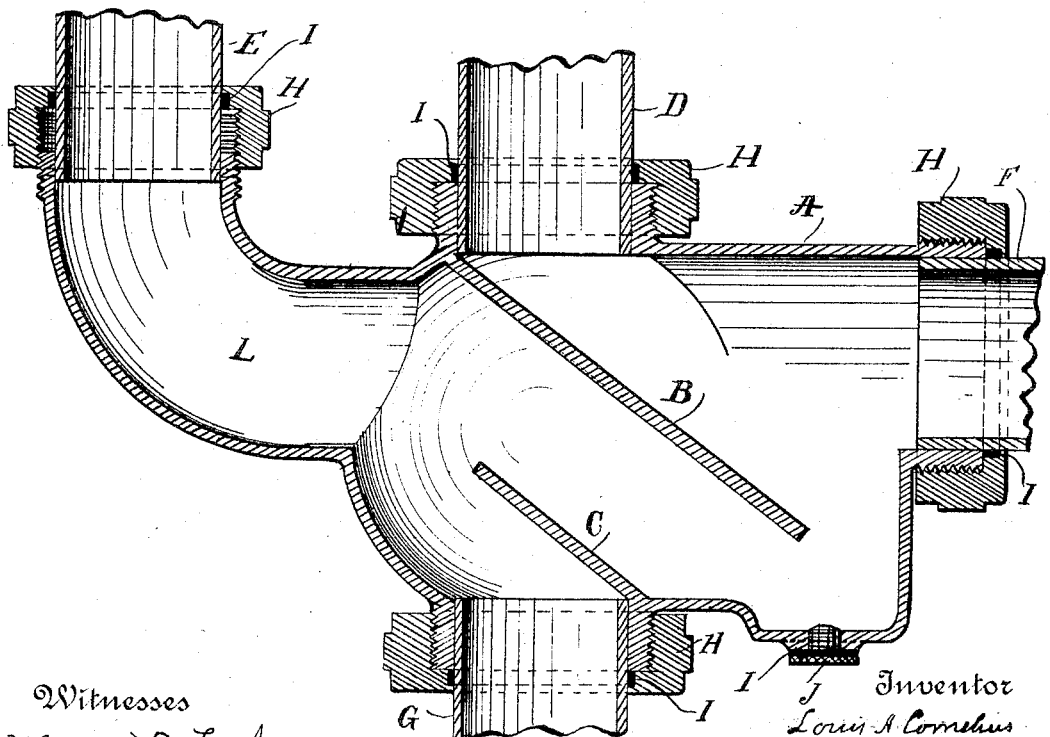

Figure 1 shows a longitudinal vertical sectional view through the center of the trap-chamber and connecting-pipes; and Fig. 2 shows a side elevation of the trap, together with a section of a bath-tub to which my invention is applied in the example shown in the drawings.

Similar letters refer to similar parts throughout the several views.

A shows the outer shell of the trap-chamber. This chamber is elongated, one end of the chamber being preferably spherical or substantially spherical in form and the elongation at one side of the spherical portion being preferably cylindrical. A' shows a section of a bath-tub having the pipe connections leading to the trap-chamber A. B is the upper inclined partition within the trap-chamber, and C is the lower inclined partition into the same chamber. The upper inclined partition extends well into the lateral extension of the trap-chamber, as shown in the drawings. By this construction of the trap-chamber and the partitions a considerable quantity of water is retained in the trap-chamber, making a very efficient water-sealing device.

D is the overflow water-pipe, coupled by the union-nut and packing I in the ordinary manner. In the drawings I have shown H and I for the unions wherever a coupling connection is used, and as these connections are the ordinary connections, for which I make no claim, they will need no further description.

E is the ventilating-pipe, coupled to the short projection L. This projection L is preferably made integral with the shell of the trap-chamber; but it may be made in any suitable manner.

F is the direct inlet-pipe opening from the tub A' into the trap-chamber, and the same preferably opens into the lateral extension, as shown.

G is the outlet-pipe at the bottom of the trap-chamber. This opening in the example of my invention shown in the drawings is in a direct line with the inlet-pipe D, and this is my preferred form. The direct inlet water-pipe F is preferably at right angles with the inlet-pipe D.

In the drawings I have shown the floor-line by P in order to illustrate the relative positions between the floor and the bath-tub.

J is a screw-plug for drawing the water from the trap. This is of any ordinary construction and need not be further described.

By constructing the trap of the elongated form, as above described, it can be placed below the bottom of the bath-tub and above the floor-line, as its elongated form allows sufficient water-space to produce an efficient sealing-trap, and this trap so constructed is adapted to receive two inlet water-pipes and a water-outlet pipe and one air-vent pipe, all within the narrow space between the bottom of the tub and the floor.

Having thus described my invention, what I claim to have invented, and desire to secure by Letters Patent of the United States, is—

1. A trap involving a casing having an inlet, an outlet and an elongated lateral extension having an inlet and a closable outlet, and superposed inclined partitions arranged in the casing and interposed between the inlet and outlet of said casing, one of said partitions extending into said lateral extension.

2. A trap involving a casing having an inlet, an outlet and an elongated lateral extension having an inlet and a closable outlet, and superposed inclined partitions arranged in the casing and interposed between the inlet and outlet of said casing.

3. A trap involving a casing having a water-inlet, a water-outlet and an elongated lateral extension having a water-inlet and a closable outlet, said casing further provided with a ventilating-opening, and superposed inclined partitions arranged in said casing and interposed between the water-inlet and the water-outlet of said casing.

4. A trap involving a casing having a water-inlet, a water-outlet and an elongated lateral extension having a water-inlet and a closable outlet, said casing further provided with a ventilating-opening, and superposed inclined partitions arranged in said casing and interposed between the water-inlet and the water-outlet of said casing, one of said partitions extending in said extension.

5. A trap involving a lateral elongated casing having a water-inlet in the top at one end thereof and a water-inlet in the lateral elongation, said inlets arranged at an angle with respect to each other, said casing further provided with an outlet in the bottom at one end thereof, and superposed partitions arranged within said casing and interposed between one of said inlets and the said outlet, said casing further provided with a ventilating-opening in that end opposite the lateral elongation.

6. In a water-sealing trap, the combination of a trap-chamber having a substantially spherical portion and a laterally-extending portion at one side of the said spherical portion, a water-inlet pipe opening into said spherical portion, a water-outlet pipe communicating with said spherical portion, a water-inlet pipe opening into said laterally-extending portion, inclined partitions within said chamber, one of said partitions extending from the spherical portion of the chamber into the laterally-extending portion of the chamber, and a ventilating-pipe communicating with said casing at that end opposite to the laterally-extending portion.

7. A water-sealing trap comprising a casing having a spherical portion terminating into a laterally-extending portion, an inlet-pipe connected to said spherical portion, an inlet-pipe connected to said laterally-extending portion, an outlet-pipe connected to said spherical portion, an elongated partition having one end extending across said spherical portion and into said laterally-extending portion, said partition arranged below the inlet-pipe connected with said spherical portion, a partition arranged within said spherical portion and above said outlet, and a ventilating-pipe communicating with said casing at that end opposite to the laterally-extending portion.

8. A water-sealing trap comprising a casing having a spherical portion terminating into a laterally-extending portion, an inlet-pipe connected to said spherical portion, an inlet-pipe connected to said laterally-extending portion, an outlet-pipe connected to said spherical portion, an elongated partition having one end extending across said spherical portion and into said laterally-extending portion, said partition arranged below the inlet-pipe connected with said spherical portion, a partition arranged within said spherical portion and above said outlet, and a ventilating-pipe communicating with said spherical portion.

9. A water-sealing trap comprising a casing having a spherical portion terminating into a laterally-extending portion, inlet and outlet pipes communicating with said spherical portion, an inlet-pipe communicating with said laterally-extending portion, an inclined partition extending across said spherical portion and into said laterally-extending portion, said partition of such length as to terminate at a point removed from the bottom of said laterally-extending portion, an inclined partition arranged over said outlet, connected at its lower end with said casing and having its upper end free, said partition arranged in said spherical portion and extending partly across the same, and a ventilating-pipe communicating with said casing at that end opposite to the laterally-extending portion.

10. A water-sealing trap involving a casing having a spherical portion terminating in an elongated laterally-extending portion, said casing provided with a pair of water-inlets and a single water-outlet, and further provided in the laterally-extending portion with a closable outlet.

11. A water-sealing trap involving a casing having a spherical portion terminating in an elongated laterally-extending portion, said casing provided with a pair of water-inlets and a single water-outlet, and further provided in the laterally-extending portion with a closable outlet, and a ventilating-pipe communicating with said spherical portion.

12. A trap involving a casing having a spherical portion terminating in an elongated laterally-extending portion, said casing provided with a pair of water-inlets and a single water-outlet, inclined partitions arranged within said casing and extending parallel with respect to each other, a ventilating-pipe communicating with said spherical portion of the casing, and said laterally-extending portion provided with a closable outlet.

In testimony whereof I have hereunto set my hand in presence of two subscribing witnesses.

LOUIS A. CORNELIUS.

Witnesses:
 EDWARD TAGGART,
 MARY S. TOOKER.